(12) United States Patent
Oleszek

(10) Patent No.: US 7,051,624 B2
(45) Date of Patent: May 30, 2006

(54) SECURITY NUT, BOLT AND SCREW

(76) Inventor: Zbigniew Oleszek, 163A Kirkdale, Sydenham, London, SE26 4QJ (GB)

( * ) Notice: Subject to any disclaimer, the term of this patent is extended or adjusted under 35 U.S.C. 154(b) by 0 days.

(21) Appl. No.: 10/863,944

(22) Filed: Jun. 9, 2004

(65) Prior Publication Data

US 2005/0002756 A1    Jan. 6, 2005

(51) Int. Cl.
*F16B 23/00* (2006.01)
(52) U.S. Cl. .......................... 81/120; 411/402
(58) Field of Classification Search .................. 81/120, 81/121.1; 411/402
See application file for complete search history.

(56) References Cited

U.S. PATENT DOCUMENTS

| | | | | |
|---|---|---|---|---|
| 3,134,292 A | * | 5/1964 | Walton | 411/403 |
| 3,302,672 A | * | 2/1967 | Walton | 81/461 |
| 3,482,481 A | * | 12/1969 | Newell et al. | 411/402 |
| 4,128,038 A | * | 12/1978 | Urwin | 411/403 |
| 4,171,662 A | * | 10/1979 | Simone et al. | 411/408 |
| 4,938,108 A | * | 7/1990 | Mekler | 81/176.15 |
| 5,381,709 A | * | 1/1995 | Louw | 81/59.1 |
| 5,598,753 A | * | 2/1997 | Lee | 81/460 |
| 6,024,522 A | * | 2/2000 | Bainbridge et al. | 411/410 |
| 6,341,927 B1 | * | 1/2002 | Hampson et al. | 411/403 |
| 6,843,153 B1 | * | 1/2005 | Rawson-Harris | 81/120 |

FOREIGN PATENT DOCUMENTS

| | | | |
|---|---|---|---|
| DE | 3921874 A1 | * | 11/1989 |
| GB | 2 169 978 | | 7/1986 |
| GB | 2169978 A | * | 7/1986 |
| GB | 2 171 040 | | 8/1986 |

* cited by examiner

*Primary Examiner*—David B. Thomas
(74) *Attorney, Agent, or Firm*—Watts Hoffmann Co., LPA

(57) ABSTRACT

A security screw fastener, e.g. a nut or bolt having a head (3) around which is a curved exterior surface (5) which is at least partially conical or dome-shaped on which several left-handed and right-handed grooves (12, 13) are formed which are designed to receive a projection (31) from an interior surface (30) of a co-operating tool (20).

22 Claims, 2 Drawing Sheets

US 7,051,624 B2

SECURITY NUT, BOLT AND SCREW

CROSS REFERENCE TO RELATED APPLICATIONS

The present application claims priority from PCT/GB02/05556 with an international filing date of Dec. 10, 2002 which, in turn, claims priority from GB Patent Application Serial No. 0129504.7, filed Dec. 10, 2001.

SUMMARY OF THE INVENTION

The present invention relates to security nuts, bolt and screw which for brevity will be termed hereafter as "screwed fastener".

Screwed fasteners mainly fall into two categories, firstly those which can be screwed into something to fasten an item with usually a common tool such as a screwdriver. This category cannot be unscrewed using the same tool, thus some security is ensured but unfastening is only possible by cutting the head off the screw. An example is a woodscrew having a transverse slotted head with one side of the slot sloped so that rotation of an applied bladed screwdriver engages with the screw in only one direction.

A second category of screwed fastener is that which requires a special tool to engage in the bolt or screwhead or nut. This head or nut is configured as to make it difficult for a wrench to grip. Thus security relies on limited availability and possession of the special tool. An example is a nut in the head of which is a narrow (1.5 mm) and comparatively deep (2 mm) annular groove. Drilled into the bottom of the groove are fine (1.2–1.5 mm) holes which are parallel to but obviously displaced from the nut's axis. The special tool has pins extending from it which fit the holes in the head of the nut so that torque on the tool in either direction will turn the nut. Unfortunately because the holes and pins are necessarily fine—there being little room on the head of the nut outside the threaded centre—the torque which can be applied before fracture of the pins is not great. As a result tools are frequently broken or nuts not sufficiently tightened.

Another kind of security nut of the second category which is more robust has a conical head in which there are usually a pair of opposed straight slots in the conical surface of the head which extend at the same angle as the cone in a diametrical plane of the nut's axis. This overcomes problems with the transmission of torque since the slots can provide a much larger engagement surface with the tool of the pin type described above. However, security is much poorer than the pin type because a common wrench or gripping tool can grip the slots to undo the nut or else the nut can be rotated by hammering a screwdriver inserted into one of the slots.

It is an object of the invention to provide an improved screwed fastener which can be subjected to sufficient torque and yet be as secure as possible.

A security screw fastener according to a first aspect of the invention has a head around which is a tool receiving curved exterior surface, the surface being at least partially conical or dome shaped, wherein several left handed and right handed grooves are formed in the curved surface for receiving a projection from an interior surface of a cooperating tool for turning the fastener.

In a second aspect of the invention there is provided a security arrangement comprising the fastener according to the aforesaid first aspect and the aforesaid cooperating tool.

The effect of having a or preferably several helical grooves on the outer curved surface of the fastener together with the conical or domed shape of the surface is to provide so poor a gripping surface for a wrench or other form of gripping tool that insufficient torque can be applied to unscrew the fastener assuming the fastener has been adequately tightened in the first place. The helical groove(s) furthermore provide no abutment surface for a tangentially applied unscrewed force from say a hammered screwdriver.

Trials indicate that the helical grooving is best formed as a three start thread and the tool should fit with its interior surface as near as possible shaped to conform with the outer curved surface of the fastener.

The tool is conveniently formed by drilling holes in the interior surface into which balls are pressed to provide the necessary projections.

DETAILED DESCRIPTION OF THE INVENTION

An embodiment of the invention will now be described with reference to the accompanying drawings in which.

Figure 1:
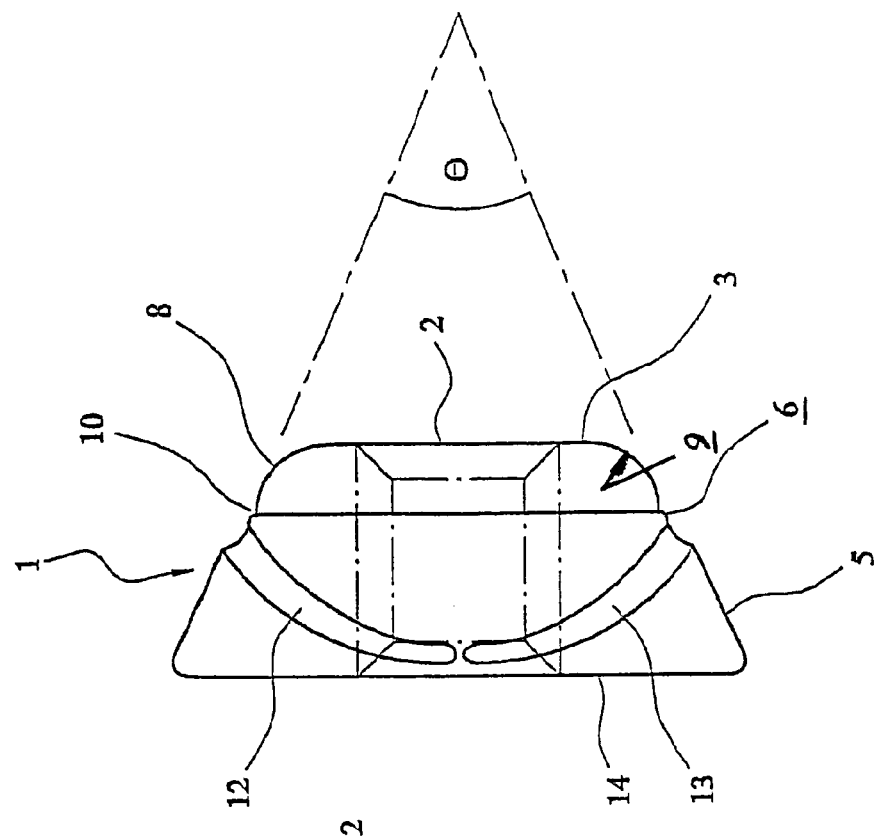
FIG. 1 is an elevation of an M8 securing nut according to the invention.
Figure 2:
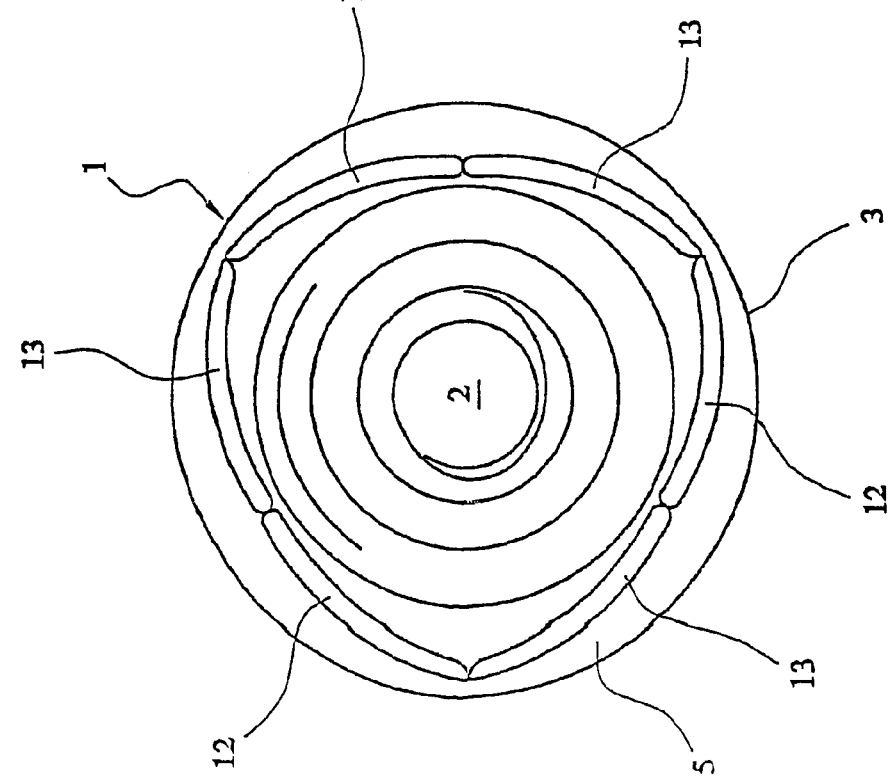
FIG. 2 is a plan view of the nut of FIG. 1.

The M8 nut generally shown in FIGS. 1 and 2 at 1 has an outer form which without the central tapped hole 2 in head 3 could equally be applied to the head of a bolt or screw.

Head 3 has a main conically curved outer surface 5 having a cone angle $\theta$ of about 50° and an outside and lower diameter of 16 mm. This angle as will be explained below, although can be within the range of 40° to 60°, is critical for good torque transmission. Continuing from the conical surface 5 with an interruption 6 is a domed surface 8 with a 2 mm radius at 9. The domed surface is based on a diameter of 11.8 mm to provide a ledge 10 at the interruption 6.

Formed in the conical surface 5 are three left handed helical grooves 12 and three right handed helical grooves 13 in the form of three start thread. By trial it was found that the thread angle should best be about 15° and this is related to the cone angle $\theta$ and also the space available between base 14 and ledge 10. If the thread angle is decreased then tool engagement is insufficient for torque transmission.

Figure 3:
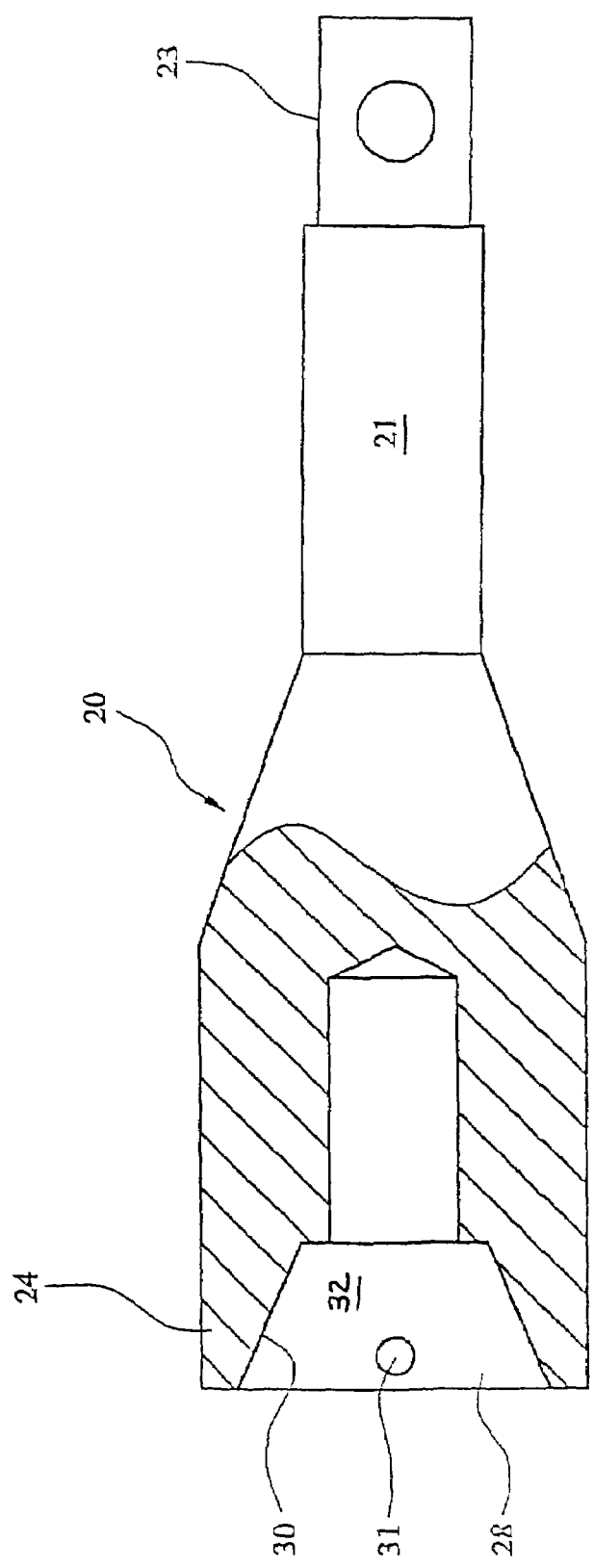
FIG. 3 is an elevation with partial cross section of a tool for driving the nut of FIG. 1.

If the nut or other kind of fastener is required to exclude unscrewing even with the tool of FIG. 3, then for a right handed screw left handed grooves 12 should not be provided.

The tool 20 shown in FIG. 3 has a shaft 21 at one end 22 of which is a squared end to take a torque wrench or else as shown is drilled to take a pin to assist a manual grip. At the opposite end 24 where the diameter is greater a central drilling 26 and conical mouth 28 snugly fits head 3, the conical inner surface 30 corresponding to conical outer surface 5 of the nut. At 120° separation around surface 30 are located three 2.5 mm diameter balls 31 set into surface 30 so that slightly less than half protrudes into space 32 in the mouth 28. Each ball 31 is arranged to engage with a groove 12 or 13 so that they draw the tool down onto the head 3 of the nut until they each reach the lower extremity of the grooves at which point surface 30 of the tool is drawn into engagement with surface 5 of the nut. The tool now locks securely onto the nut for fully effective torque transmission.

The size of balls 31 and the cooperating helical grooves depends on nut sizes. Thus M5, M6 and M8 nuts will require 2.5 mm balls, M10 and M12 nuts 3 mm balls and M16 nuts 4 mm balls.

The precise limits of the thread angle of the helical grooves is not yet known but a slight angle of 5° was found not conducive to good engagement between tool and nut. It is believed 10° to 20° is the range of thread angles with 15° being preferred.

The invention claimed is:

1. A security screw fastener having a head around which is a tool receiving curved exterior surface, the surface being at least partially conical or dome shaped, characterized in that a plurality of left handed and right handed grooves are arcuately formed in the curved surface for receiving a projection from an interior surface of a cooperating tool for turning the fastener.

2. A fastener according to claim 1 wherein said grooves are formed with a thread angle of 10° to 20°.

3. A fastener according to claim 2 wherein the thread angle is substantially 15°.

4. A securing arrangement comprising the fastener of claim 1 and a cooperating tool for turning the fastener, the tool having an inner surface in a mouth such that it mates with the curved exterior surface of the fastener, the inner surface of the tool having projections to fit said grooves of the fastener.

5. An arrangement as claimed in claim 4 wherein said projections are ball(s).

6. The security screw fastener of claim 1, wherein said grooves comprise a first and second end, further wherein said first end is open for receiving a cooperating tool having projections that advance along said grooves from said first end toward said second end, said grooves becoming progressively narrower from said first to second ends resulting in an interference connection with said projections.

7. A security screw fastener having a head around which is a tool receiving curved exterior surface, the surface being at least partially conical or dome shaped, characterized in that several left handed and right handed grooves are formed in the curved surface for receiving a projection from an interior surface of a cooperating tool for turning the fastener, wherein said grooves comprise six helical grooves that are from as left handed and right handed on said curved surface.

8. A security screw fastener having a head around which is a tool receiving curved exterior surface, the surface being at least partially conical or dome shaped, characterized in that several left handed and right handed grooves are formed in the curved surface for receiving a projection from an interior surface of a cooperating tool for turning the fastener, wherein said curved surface is conical with a cone angle of 40° to 60°.

9. A fastener according to claim 8 wherein the cone angle is substantially 50°.

10. A fastener as claimed in claim 8 wherein the conical surface terminates at an interruption point between the head and base of the fastener to provide a ledge, the form of the fastener continuing towards the head at a reduced diameter.

11. A security screw fastener having a head around which is a tool receiving curved exterior surface, the surface being at least partially conical or dome shaped, characterized in that several left handed and right handed grooves are formed in the curved surface for receiving a projection from an interior surface of a cooperating tool for turning the fastener, wherein said grooves have a curved bottom to engage with a corresponding curve of a curved projection and a cooperating tool.

12. A security screw fastener comprising:
   (a) a head having a conically curved surface for positioning a cooperating tool;
   (b) a plurality of grooves formed in said curved surface; and
   (c) a tapped hole for engaging a corresponding threaded connector to said fastener;
   (d) wherein said grooves are tapered for promoting interference with a cooperating tool, thereby increasing the torque transmission capabilities of said fastener.

13. The security screw fastener of claim 12, wherein said grooves have a closed end.

14. The security screw fastener of claim 12 having a cooperating tool wherein a plurality of projections extend from said cooperating tool for engaging said grooves.

15. The security screw fastener of claim 14, wherein said cooperating tool projections are substantially spherical.

16. The security screw fastener of claim 12, wherein said grooves are helical.

17. The security screw fastener of claim 12, wherein said grooves comprise a first and second end, further wherein said first end is open for receiving a cooperating tool having projections that advance along said grooves from said first end toward said second end, said grooves becoming progressively shallower from said first to second ends resulting in an interference connection with said projections.

18. The security screw fastener of claim 12, wherein said plurality of grooves comprise right handed grooves.

19. The security screw fastener of claim 12, wherein said plurality of grooves comprise left handed grooves.

20. The security screw fastener of claim 12, wherein said plurality of grooves comprise both right handed and left handed grooves.

21. The security screw fastener of claim 12, wherein said grooves are formed with a thread angle of 10° to 20°.

22. The security screw fastener of claim 21, wherein said thread angle is substantially 15°.

* * * * *

UNITED STATES PATENT AND TRADEMARK OFFICE
CERTIFICATE OF CORRECTION

PATENT NO.         : 7,051,624 B2
APPLICATION NO. : 10/863944
DATED              : May 30, 2006
INVENTOR(S)        : Zbigniew Oleszek It is certified that error appears in the above-identified patent and that said Letters Patent is hereby corrected as shown below:

On the Title page item [30] of the patent, add-the following:

--This application is a continuation of PCT International Application No.

PCT/GB02/05556, filed December 10, 2002.--

Signed and Sealed this

Twenty-sixth Day of June, 2007

JON W. DUDAS
*Director of the United States Patent and Trademark Office*